(12) United States Patent
Zhao et al.

(10) Patent No.: US 12,490,096 B2
(45) Date of Patent: Dec. 2, 2025

(54) CONFIGURATION METHOD, DEVICE AND SYSTEM OF SECURITY MODE AND COMPUTER-READABLE STORAGE MEDIUM

(71) Applicant: CHINA TELECOM CORPORATION LIMITED, Beijing (CN)

(72) Inventors: Xiaoyin Zhao, Beijing (CN); Weiliang Xie, Beijing (CN)

(73) Assignee: CHINA TELECOM CORPORATION LIMITED, Beijing (CN)

(*) Notice: Subject to any disclaimer, the term of this patent is extended or adjusted under 35 U.S.C. 154(b) by 385 days.

(21) Appl. No.: 18/021,686

(22) PCT Filed: Apr. 29, 2021

(86) PCT No.: PCT/CN2021/090800
§ 371 (c)(1),
(2) Date: Feb. 16, 2023

(87) PCT Pub. No.: WO2022/037123
PCT Pub. Date: Feb. 24, 2022

(65) Prior Publication Data
US 2023/0336998 A1  Oct. 19, 2023

(30) Foreign Application Priority Data
Aug. 17, 2020 (CN) .......... 202010825350.7

(51) Int. Cl.
*H04M 1/66* (2006.01)
*H04W 12/041* (2021.01)
*H04W 12/108* (2021.01)

(52) U.S. Cl.
CPC ....... *H04W 12/108* (2021.01); *H04W 12/041* (2021.01)

(58) Field of Classification Search
CPC ....... H04L 63/061; H04L 63/06; H04L 63/12; H04W 12/041; H04W 12/108;
(Continued)

(56) References Cited

U.S. PATENT DOCUMENTS 11,070,981 B2 * 7/2021 Lee .............. H04W 12/10
2014/0179316 A1  6/2014 Hu
(Continued)

FOREIGN PATENT DOCUMENTS

CN  101330376 A  12/2008
CN  102316528 A   1/2012
(Continued)

OTHER PUBLICATIONS

International Search Report and Written Opinion issued on Jul. 28, 2021 in corresponding Application No. PCT/CN2021/090800; 8 pages.
(Continued)

*Primary Examiner* — Shantell L Heiber
(74) *Attorney, Agent, or Firm* — Andrew M. Calderon; Calderon Safran & Wright P.C.

(57) ABSTRACT

This disclosure discloses a configuration method, a configuration device, and a configuration system of security mode and a computer readable storage medium, relating to mobile communications technologies. The configuration method of security mode includes: acquiring an integrity protection algorithm, an encryption algorithm, an original key and an operator identification of a core network from the core network, wherein the original key is also sent to a user to start a security mode, the core network is a core network of a first operator or a second operator, and the first operator and the second operator use a same shared carrier in a co-construction and sharing base station; determining a key generation algorithm preset by an operator to which the user (Continued)

belongs according to the operator identification; generating an integrity protection key and an encryption key of the user according to the key generation algorithm and the original key; and sending a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

20 Claims, 7 Drawing Sheets

(58) Field of Classification Search
CPC ... H04W 12/03; H04W 12/069; H04W 12/08; H04W 12/12; H04W 12/106; H04W 12/10
See application file for complete search history.

(56) References Cited

U.S. PATENT DOCUMENTS

| | | | | |
|---|---|---|---|---|
| 2016/0374104 | A1* | 12/2016 | Watfa | H04W 12/04 |
| 2017/0070902 | A1* | 3/2017 | Fukuta | H04W 16/14 |
| 2018/0062847 | A1* | 3/2018 | Mildh | H04W 12/033 |
| 2019/0159024 | A1 | 5/2019 | Rost et al. | |
| 2019/0159029 | A1* | 5/2019 | Li | H04W 12/06 |
| 2019/0349406 | A1* | 11/2019 | Pan | H04L 63/205 |
| 2020/0281031 | A1* | 9/2020 | Wang | H04W 12/041 |
| 2020/0374691 | A1 | 11/2020 | Li et al. | |
| 2020/0374972 | A1* | 11/2020 | Geng | H04W 12/0431 |

FOREIGN PATENT DOCUMENTS

| | | |
|---|---|---|
| CN | 103202079 A | 7/2013 |
| CN | 109561427 A | 4/2019 |
| CN | 111031586 A | 4/2020 |

OTHER PUBLICATIONS

3rd Generation Partnership Project; Technical Specification Group Services and System Aspects;. "Security Architecture and Procedures for 5G system (Release 16)" 3GPP TS 33.501 VI6.2.0, Mar. 27, 2020 (Mar. 27, 2020). pp. 67-68. and section 6.7.4.
3rd Generation Partnership Project; Technical Specification Group Services and System Aspects;. "Security Architecture and Procedures for 5G system (Release 16)" 3GPP TS 33.501 VI6.2.0, Mar. 27, 2020 (Mar. 27, 2020). pp. 67-68. and section 6.7.4; 227 pages.
Office Action issued in corresponding Chinese Patent Application No. 202010825350.7 on May 18, 2023; 23 pages.
Office Action issued in corresponding Chinese Patent Application No. 202010825350.7 on Sep. 22, 2023; 18 pages.
Japanese Office Action dated May 9, 2024 in JP Application No. 2023-512155, with English Translation, 6 pages.

* cited by examiner

CONFIGURATION METHOD, DEVICE AND SYSTEM OF SECURITY MODE AND COMPUTER-READABLE STORAGE MEDIUM

CROSS-REFERENCE TO RELATED APPLICATIONS

This application is based on and claims priority from CN application No. 202010825350.7, filed on Aug. 17, 2020, the disclosure of which is incorporated herein by reference in its entirety.

TECHNICAL FIELD

The present invention relates to the field of mobile communications technologies, and in particular, to configuration method, device and system of security mode and computer readable storage medium.

BACKGROUND

In 5G construction, two operators may co-construct and share a base station and use a shared carrier. That is, the shared 5G base station connects the core networks of two operators, and the two operators share one cell (i.e., share one carrier).

Integrity protection is a necessary technical means to ensure that information or data is not tampered with unauthorizedly, or can be discovered quickly after tampering. The 4G era has always stressed integrity protection of signaling. In the age of 5G, data integrity protection is also essential.

SUMMARY

According to a first aspect of some embodiments of the present invention, there is provided a configuration method of security mode, comprising: acquiring an integrity protection algorithm, an encryption algorithm, an original key and an operator identification of a core network from the core network, wherein the original key is also sent to a user to start a security mode, the core network is a core network of a first operator or a second operator, and the first operator and the second operator use a same shared carrier in a co-construction and sharing base station; determining a key generation algorithm preset by an operator to which the user belongs according to the operator identification; generating an integrity protection key and an encryption key of the user according to the key generation algorithm and the original key; and sending a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

In some embodiments, the integrity protection key comprises an integrity protection key of control plane, and the encryption key comprises an encryption key of control plane and an encryption key of user plane.

In some embodiments, the configuration method of security mode further comprises: acquiring a security mode completion message from the terminal of the user, wherein the security mode completion message is sent by the terminal after the verification of the security mode command is passed; performing integrity verification on the security mode completion message; and sending a setup completion message to the core network of the operator to which the user belongs in response to passing the integrity verification of the security mode completion message, wherein the setup completion message comprises the integrity protection algorithm and the encryption algorithm in the security mode command and is used for instructing the core network to start a security control process.

In some embodiments, the operator identification is a Public Land Mobile Network (PLMN) identification, and the determining a key generation algorithm preset by the operator to which the user belongs according to the operator identification comprises: acquiring the PLMN identification corresponding to the user to start the security mode; and determining the key generation algorithm preset by the operator to which the user belongs according to a corresponding relation between the preset PLMN identification and the key generation algorithm.

In some embodiments, the original key is generated by the core network in response to initiating the security mode of an access stratum after a radio resource control (RRC) connection setup is completed and authentication of Layer 3 (L3) is passed.

In some embodiments, the configuration method of security mode further comprises: determining, by an Access and Mobility Management Function (AMF) in the core network, an original key of Non-Access Stratum (NAS) signaling of the user according to the operator identification of the user, wherein the core network is shared by the first operator and the second operator; and generating, by the AMF, an integrity protection key of NAS and an encryption key of NAS by adopting an integrity protection algorithm of NAS signaling and an encryption algorithm of NAS signaling corresponding to the operator identification.

In some embodiments, the configuration method of security mode further comprises: generating, by an AMF in the core network, an original key of the first operator and an original key of the second operator; and sending, by the AMF, the integrity protection algorithm, the encryption algorithm and the original key of the first operator, and the integrity protection algorithm, the encryption algorithm and the original key of the second operator to the base station.

In some embodiment, the operator identification is a PLMN identification.

According to a second aspect of some embodiments of the present invention, there is provided a configuration device of security mode comprising: an acquiring module configured to acquire an integrity protection algorithm, an encryption algorithm, an original key and an operator identification of a core network from the core network, wherein the original key is also sent to a user to start a security mode, the core network is a core network of a first operator or a second operator, and the first operator and the second operator use a same shared carrier in a co-construction and sharing base station; an algorithm determining module configured to determine a key generation algorithm preset by an operator to which the user belongs according to the operator identification; a key generation module configured to generate an integrity protection key and an encryption key of the user according to the key generation algorithm and the original key; and a command sending module configured to send a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

In some embodiments, the integrity protection key comprises an integrity protection key of control plane, and the encryption key comprises an encryption key of control plane and an encryption key of user plane.

In some embodiments, the configuration device of security mode further comprises: a verification module configured to acquire a security mode completion message from the terminal of the user, wherein the security mode completion message is sent by the terminal after the verification of the security mode command is passed; perform integrity verification on the security mode completion message; and send a setup completion message to the core network of the operator to which the user belongs in response to passing the integrity verification of the security mode completion message, wherein the setup completion message comprises the integrity protection algorithm and the encryption algorithm in the security mode command and is used for instructing the core network to start a security control process.

In some embodiments, the operator identification is a Public Land Mobile Network (PLMN) identification, and the algorithm determination module is further configured to: acquire the PLMN identification corresponding to the user to start the security mode; and determine the key generation algorithm preset by the operator to which the user belongs according to a corresponding relation between the preset PLMN identification and the key generation algorithm.

In some embodiments, the original key is generated by the core network in response to initiating the security mode of an access stratum after a RRC connection setup is completed and authentication of Layer 3 is passed According to a third aspect of some embodiments of the present invention, there is provided a configuration device of security mode comprising: a memory; and a processor coupled to the memory, the processor configured to perform any of the foregoing configuration method of security modes based on instructions stored in the memory.

According to a fourth aspect of some embodiments of the present invention there is provided a configuration system of security mode comprising: a base station, comprising any one of the foregoing configuration device of security mode; a first core network of a first operator, configured to send an integrity protection algorithm and an encryption algorithm of the first core network, an original key generated by the first core network, and an operator identification of the first core network to the base station, and send the original key generated by the first core network to a user of the first operator; and a second core network of a second operator, configured to send an integrity protection algorithm and an encryption algorithm of the second core network, an original key generated by the second core network, and an operator identification of the second core network to the base station, and send the original key generated by the second core network to a user of the second operator, wherein the first operator and the second operator use a same shared carrier in the base station.

In some embodiments, the configuration system of security mode further comprises: a terminal configured to generate an integrity protection key and an encryption key using the original key and the key generation algorithm sent from the core network of the operator of the terminal; generate verification information by using the integrity protection key generated by the terminal; and send the security mode completion message to the base station in a case where the verification information generated by the terminal is consistent with the verification information in the security mode command sent from the base station.

According to a fifth aspect of some embodiments of the present invention, there is provided a configuration system of security mode comprising: a base station, comprising any one of the foregoing configuration device of security mode; and AMF of the core network configured to determine an original key of NAS signaling of the user according to an operator identification of the user, wherein the core network is shared by the first operator and the second operator; and generate an integrity protection key of NAS signaling and an encryption key of NAS signaling by adopting an integrity protection algorithm of NAS signaling and an encryption algorithm of NAS signaling corresponding to the operator identification.

In some embodiments, the AMF is further configured to generate an original key of the first operator and an original key of the second operator; and send the original key, the integrity protection algorithm and the encryption algorithm of the first operator, and the original key, the integrity protection algorithm and the encryption algorithm of the second operator to a base station.

In some embodiments, the operator identification is a PLMN identification.

According to a sixth aspect of some embodiments of the present invention, there is provided a non-transitory computer readable storage medium having a computer program stored thereon, wherein the program when executed by a processor implements any of the foregoing configuration method of security modes.

Other features of the present invention and advantages thereof will become apparent from the following detailed description of exemplary embodiments of the invention, which proceeds with reference to the accompanying drawings.

BRIEF DESCRIPTION OF THE DRAWINGS

In order to illustrate the embodiments of the present invention or the technical solutions in the prior art more clearly, the drawings used in the embodiments or the description of the prior art will be briefly described below, it is obvious that the drawings in the following description are only some embodiments of the present invention, and for those skilled in the art, other drawings can be obtained according to the drawings without creative efforts.

DETAILED DESCRIPTION

Figure 1:
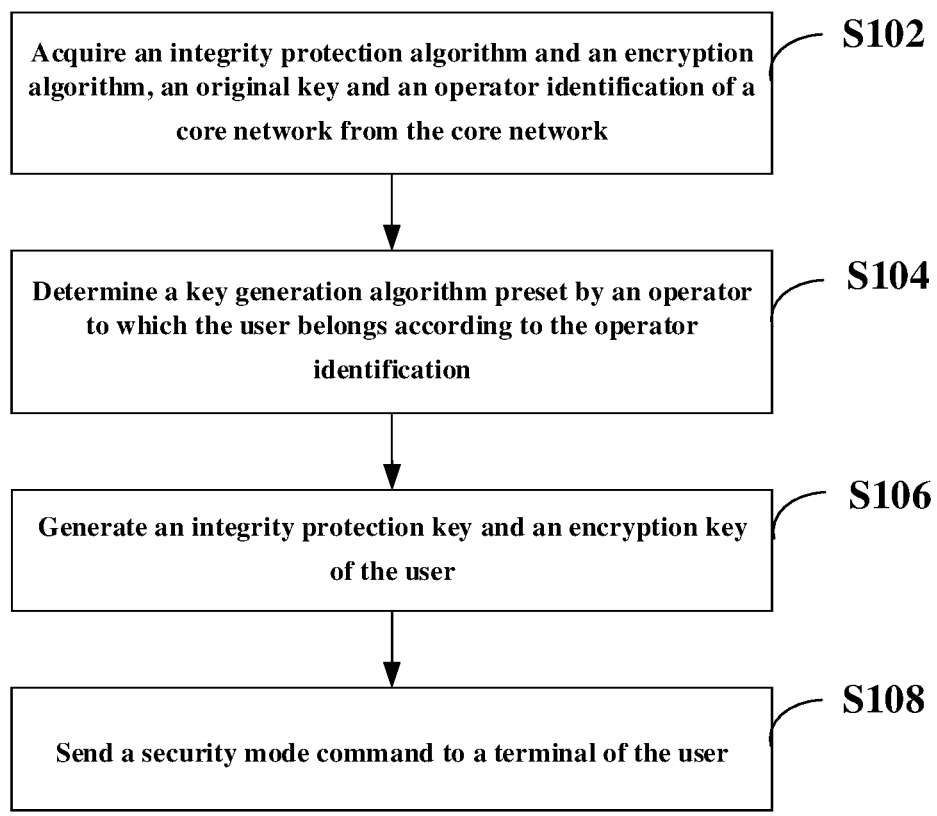
FIG. 1 illustrates a flow diagram of a configuration method of security mode according to some embodiments of the present invention.

The technical solutions in the embodiments of the present invention will be clearly and completely described below with reference to the drawings in the embodiments of the present invention, and it is obvious that the described embodiments are only a part of the embodiments of the present invention, and not all of the embodiments. The following description of at least one exemplary embodiment is merely illustrative in nature and is in no way intended to limit the invention, its application, or uses. All other embodiments, which can be obtained by a person skilled in the art without inventive step based on the embodiments of the present invention, are within the scope of protection of the present invention.

The relative arrangement of the components and steps, the numerical expressions and numerical values set forth in these embodiments do not limit the scope of the present invention unless it is specifically stated otherwise.

Meanwhile, it should be understood that the sizes of the respective portions shown in the drawings are not drawn in an actual proportional relationship for the convenience of description.

Techniques, methods, and device known to a person skilled in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it needs not be discussed further in subsequent figures.

After analyzing the related technologies, the inventor found that different services of different operators, which are carried by a co-construction and sharing 5G base station, may have different requirements for the services. For example, some services require ultra-low latency, which has high requirements for signaling integrity protection; some services require independent user data integrity protection. In the related art, a method for performing differentiated integrity protection on co-construction and carrier sharing base station of different operators has not been considered yet.

The embodiment of the invention aims to solve the technical problem that: how to provide an integrity protection method supporting a co-construction and sharing base station for multiple operators.

FIG. 1 illustrates a flow diagram of a configuration method of security mode according to some embodiments of the inventions. As shown in FIG. 1, the configuration method of security mode of the embodiment comprises steps S102 to S108. The method of this embodiment may be performed in a base station.

In step S102, an integrity protection algorithm, an encryption algorithm, an original key and an operator identification of a core network sent from the core network are acquired, wherein the original key is further sent to a user to start a security mode, the core network is a core network of a first operator or a second operator, and the first operator and the second operator use a same shared carrier in a co-construction and sharing base station.

In some embodiments, the co-construction and sharing base station is a 5G base station.

In step S104, a key generation algorithm preset by an operator to which the user belongs is determined according to the operator identification.

The first operator and the second operator both preset their own key generation algorithms according to factors such as service requirements and the like. When the user to start the security mode is a user of the first operator, an integrity protection key and an encryption key are generated by using a key generation algorithm preset by the first operator; and when the user to start the security mode is a user of the second operator, an integrity protection key and an encryption key are generated by using a key generation algorithm preset by the second operator. Therefore, the base station side can adopt corresponding algorithms to generate the key for the users of different operators.

In some embodiments, the key generation algorithm is a key derivation function, such that the integrity protection key and the encryption key may be generated using the key derivation function. The role of the key derivation function is to derive one or more pieces of key data from a shared secret bit string.

In some embodiments, a PLMN (Public Land Mobile Network) identification corresponding to the user to start the security mode is obtained, for example, from a core network; and a key generation algorithm preset by the operator to which the user belongs is determined according to the corresponding relation between the preset PLMN identification and the key generation algorithm.

In step S106, an integrity protection key and an encryption key of the user are generated based on the key generation algorithm and a key generated by the core network of the operator to which the user belongs, i.e., the original key.

In some embodiments, the integrity protection key comprises an integrity protection key of control plane, and the encryption key comprises an encryption key of control plane and an encryption key of user plane. In some embodiments, these keys are used for integrity protection and encryption of a PDCP (Packet Data Convergence Protocol) layer. The integrity protection key of control plane and the encryption key of control plane are used to ensure the transmission security of RRC (Radio Resource Control) message on a control plane of a radio link. For example, the integrity protection key of control plane is used for integrity protection and the encryption key of control plane is used for performing encryption when sending a RRC message in the PDCP layer. The encryption key of user plane is used for the transmission security of IP (Internet Protocol) packets of a user plane over a radio link. For example, the encryption key of user plane is used for encryption in the PDCP layer when transmitting IP packets.

In step S108, a security mode command is sent to a terminal of the user, wherein the security mode command comprises verification information encrypted by using the integrity protection key of the user, the integrity protection algorithm and the encryption algorithm, and the terminal has the key generation algorithm preset by the operator to which the user belongs.

Since the terminal of the user also has the original key and the key generation algorithm, the integrity protection key and the encryption key can be generated, and the verification information in the security mode command can be verified by using the integrity protection key. When the verification is passed, the terminal can acquire the integrity protection algorithm and the encryption algorithm in the security mode command, so that the terminal and the base station can utilize the corresponding algorithms and the integrity protection key and the encryption key which are generated respectively to realize integrity protection and encryption in the communication process.

In the method of the above embodiment, adaptive keys can be generated according to service requirements of different operators by determining the corresponding integrity protection algorithm and the encryption algorithm according to the operator to which the user belongs, and generating the key by adopting the corresponding key generation algorithm under the condition that the base station is a co-construction and sharing base station. Therefore, differentiation of the integrity protection of access stratum is realized, and flexibility of service bearing of a shared carrier system is improved.

In some embodiments, the configuration method of security mode is implemented by cooperation of the base station, the core network and the terminal. An embodiment of the configuration method of security mode of the present invention is described below with reference to FIG. 2.

Figure 2:
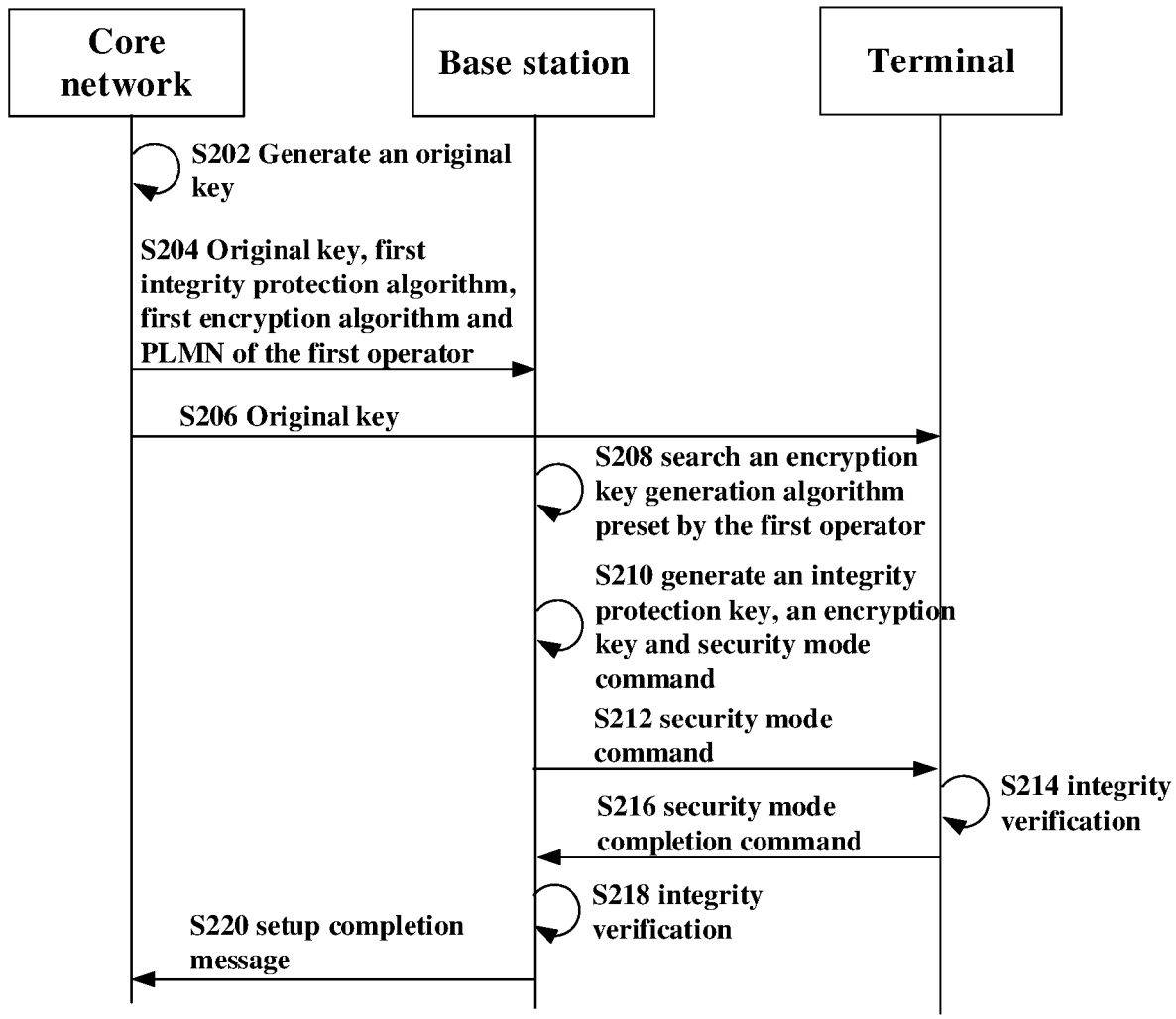
FIG. 2 illustrates a flow diagram of a configuration method of security mode according to some embodiments of the present invention.

FIG. 2 illustrates a flow diagram of a configuration method of security mode according to some embodiments of the inventions. As shown in FIG. 2, the configuration method of security mode of this embodiment comprises steps S202 to S220.

In step S202, after a RRC connection setup is completed and authentication of Layer 3 (L3) is passed, the core network generates an original key in response to the security mode of a access stratum is initiated. In this embodiment, the core network is set as the core network of the first operator.

In step S204, the core network sends the original key, a first integrity protection algorithm and a first encryption algorithm used by the first operator, and the PLMN identification of the first operator to the base station.

In some embodiments, the core network sends a list of integrity protection algorithms and a list of encryption algorithms supported by the user's terminal and the capability parameter of the terminal to the base station, and the base station selects the first integrity protection algorithm and the first encryption algorithm to be applied to the user.

In step S206, the core network sends the original key to the terminal of the user to start the security mode, where the terminal has a key generation algorithm preset by an operator (i.e., the first operator) to which the user belongs.

In some embodiments, the core network sends the original key to the terminal through Non-Access Stratum (NAS) signaling.

In step S208, the base station determines that the user is a user of the first operator according to the PLMN identification, and searches for the key generation algorithm preset by the first operator which is the same as the key generation algorithm preset by the terminal.

In step S210, the base station generates the integrity protection key and the encryption key of the user according to the key generation algorithm preset by the first operator and the original key, and generates the security mode command comprising verification information encrypted with the integrity protection key of the user, the first integrity protection algorithm and the first encryption algorithm.

In some embodiments, the verification information is generated according to the integrity protection key and other configuration parameters comprising, for example, transmission direction, bearer identification, and the like, and the configuration parameters may be obtained from the core network.

In step S212, the base station sends a security mode command to the user's terminal.

In step S214, the terminal performs integrity verification on the security mode command.

For example, the terminal generates the integrity protection key and the encryption key by using the original key and the key generation algorithm, generates verification information by using the integrity protection key and the configuration parameters of the terminal, and determines whether the verification information generated by the terminal is consistent with the verification information sent by the base station. If the two are consistent, the verification is passed. The terminal may then perform an integrity protection operation and an encryption operation using the first integrity protection algorithm and the first encryption algorithm transmitted by the base station, and the integrity protection key and the encryption key generated by the terminal.

In step S216, the terminal sends a security mode completion message to the base station.

In step S218, the base station performs integrity verification on the security mode completion message. For example, the base station also performs verification using the integrity protection key in a case where the terminal generates the security mode completion message based on the integrity protection key.

In step S220, the base station sends a setup completion message to the core network of the operator to which the user belongs in response to passing the integrity verification of the security mode completion message, wherein the setup completion message comprises the integrity protection algorithm and the encryption algorithm in the security mode command.

By the method of the embodiment, the base station generates adapted keys according to service requirements of different operators in a case where the base station is a co-construction and sharing base station. The terminal can also performs verification after obtaining the keys, and complete the initiation process of the security mode through the interaction process of the base station and the core network. Therefore, differentiation of the integrity protection of the access stratum is realized, and flexibility of the service bearing of the shared carrier system is improved.

In some embodiments, the first operator and the second operator may also co-construct and shared a core network, and manage operator identities, such as PLMN, of the two operators in a core network element of Access and Mobility Management Function (AMF). An embodiment of the configuration method of security mode of the shared core network of the present invention is described below with reference to FIG. 3.

Figure 3:
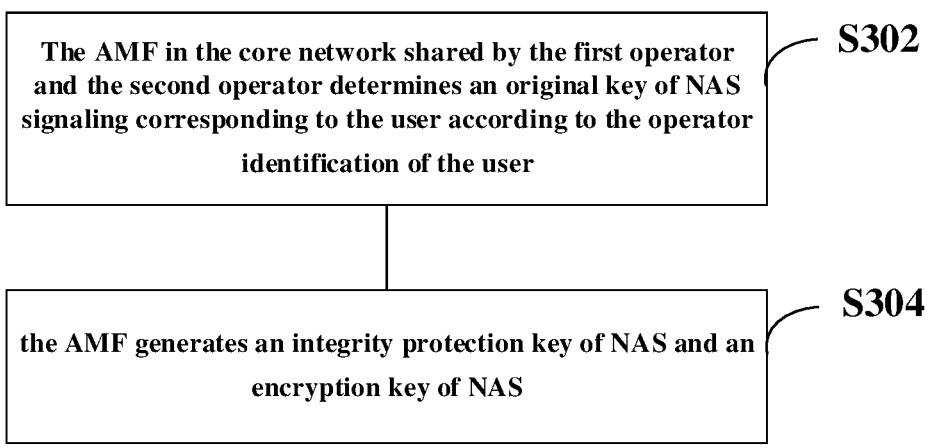
FIG. 3 illustrates a flow diagram of a method for security mode configuration of a shared core network in accordance with some embodiments of the present invention.

FIG. 3 illustrates a flow diagram of a method for security mode configuration of a shared core network in accordance with some embodiments of the invention. As shown in FIG. 3, the method for configuring security mode of shared core network of this embodiment comprises steps S302 to S304.

In step S302, the AMF in the core network shared by the first operator and the second operator determines an original key of NAS signaling corresponding to a user according to the operator identification of the user.

In step S304, the AMF generates an integrity protection key of NAS and an encryption key of NAS by using the integrity protection algorithm of NAS signaling and the encryption algorithm of NAS signaling corresponding to the operator identification.

For example, in the AMF, what algorithm should be used by the current user is determined through a PLMN identifier and an encryption/integrity protection algorithm decision maker, and a key KAFM_1 or KAFM_2 is generated according to an algorithm corresponding to each operator; then, the algorithm module of the first operator generates the keys $K_{NASint\_1}$ and $K_{NASenc\_1}$ dedicated to protecting NAS from KAFM_1, and the algorithm module of the second operator generates the keys $K_{NASint\_2}$ and $K_{NASenc\_2}$ dedicated to protecting NAS from KAFM_2.

In some embodiments, the original keys of the first operator and the second operator may also be generated and sent by the shared core network. An embodiment of the configuration method of security mode of the present invention is described below with reference to FIG. 4.

Figure 4:
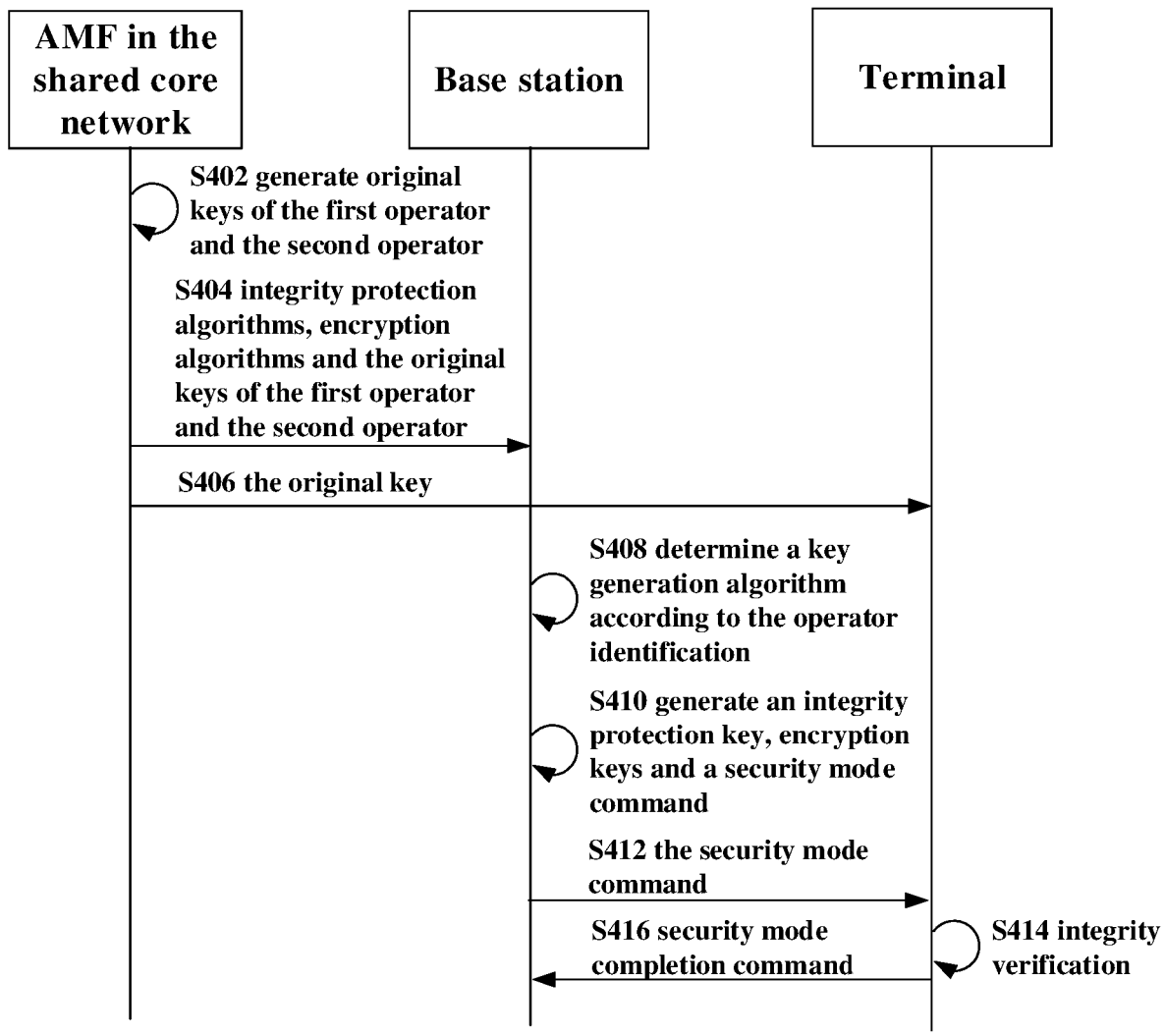
FIG. 4 is a flow diagram illustrating a configuration method of security mode according to further embodiments of the invention.

FIG. 4 is a flow diagram illustrating a configuration method of security mode according to further embodiments of the invention. As shown in FIG. 4, the configuration method of security mode of this embodiment comprises steps S402 to S416.

In step S402, AMF in the core network shared by the first operator and the second operator generates an original key of the first operator and an original key of the second operator.

In step S404, the AMF sends an integrity protection algorithm, an encryption algorithm and an original key of the first operator, and an integrity protection algorithm, an encryption algorithm and an original key of the second operator to a base station. The first operator and the second operator use a same shared carrier in the base station.

In step S406, the AMF sends the corresponding original key to the terminal of the user to start the security mode.

In step S408, the base station determines a key generation algorithm preset by the operator to which the user belongs according to the operator identification.

In step S410, the base station generates an integrity protection key of control plane, an encryption key of control plane, an encryption key of user plane of the user and a security mode command according to the key generation algorithm and the original key corresponding to the operator to which the user belongs, where the original key is sent from the core network, and the security mode command comprises verification information encrypted by using the integrity protection key of the user, the integrity protection algorithm and the encryption algorithm.

For example, an algorithm module of the first operator in the AMF generates original keys KgNB_1 and NH_1 which, together with an algorithm 1 corresponding to the first operator, are sent to the base station; similarly, an algorithm module of the second operator in the AMF generates KgNB_2 and NH_2 which, together with an algorithm 2 corresponding to the second operator, are sent to the base station.

Then, for a user of the first operator, the base station calculates an integrity protection key $K_{RRCint\_1}$ of a control plane of the first operator, a integrity protection key $k_{UPint\_1}$ of a user plane of the first operator, and keys $KU_{Penc\_1}$ and $K_{RRCenc\_1}$ required for encrypting for user plane and the control plane according to the KgNB_1, NH_1 and the algorithm 1. Similarly, for a user of the second operator, the base station calculates an integrity protection key $K_{RRCint\_2}$ of a control plane of the second operator, an integrity protection key $K_{UPint\_2}$ of a user plane of the second operator, and keys $K_{UPenc\_2}$ and $K_{RRCenc\_2}$ required for encrypting for the user plane and the control plane according to KgNB_2, NH_2 and the algorithm 22.

In step S412, the base station sends a security mode command to the terminal of the user which has a key generation algorithm preset by the operator to which the user belongs.

In step S414, the terminal of the user performs decoding and integrity-verification on the security mode command.

In step S416, the terminal takes out the encryption algorithm in the security mode command if the verification is passed, and sends a security mode completion command to the base station.

Since a 5G base station of the co-construction and sharing core network may carry different services of different operators, and different application scenarios generate different types of communication data with different requirements on data integrity protection, it is required to flexibly consider integrity protection for different types of services. The embodiment can deal with the situation that different operators are configured with differentiated integrity protection algorithms when sharing a core network, which improves the flexibility of co-construction and sharing service bearing.

An embodiment of the configuration device of security mode of the present invention is described below with reference to FIG. 5.

Figure 5:
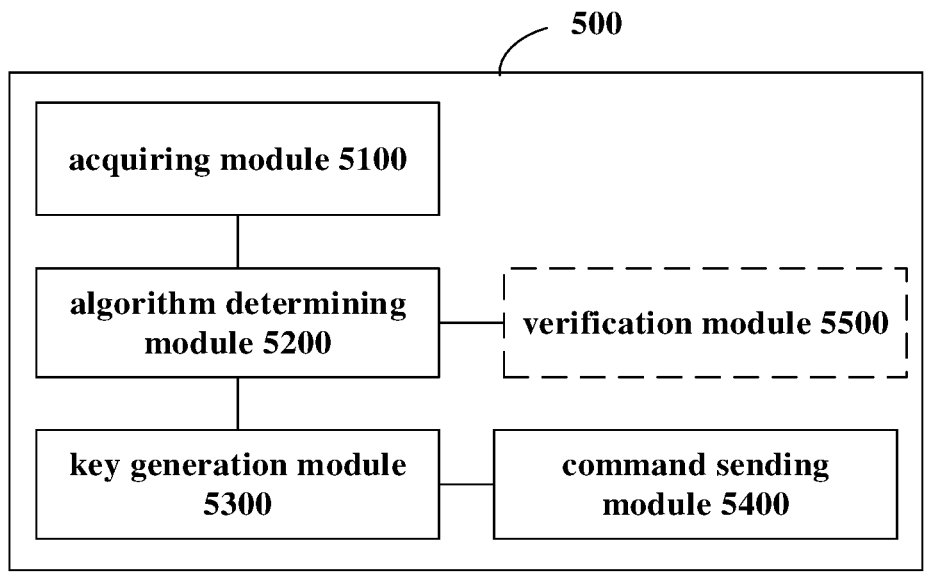
FIG. 5 illustrates a structural diagram of a configuration device of security mode according to some embodiments of the invention.

FIG. 5 illustrates a structural diagram of a configuration device of security mode according to some embodiments of the invention. As shown in FIG. 5, the configuration device of security mode 500 of this embodiment comprises: an acquiring module 5100 configured to acquire an integrity protection algorithm, an encryption algorithm, an original key and an operator identification of a core network from the core network, wherein the original key is also sent to a user to start a security mode, the core network is a core network of a first operator or a second operator, and the first operator and the second operator use a same shared carrier in a co-construction and sharing base station; an algorithm determining module 5200 configured to determine a key generation algorithm preset by an operator to which the user belongs according to the operator identification; a key generation module 5300 configured to generate an integrity protection key and an encryption key of the user according to the key generation algorithm and the original key; a command sending module 5400 configured to send a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

In some embodiments, the security mode configuration 500 further comprises: an verification module 5500 configured to acquire a security mode completion message from the terminal of the user, wherein the security mode completion message is sent by the terminal after the verification of the security mode command is passed; perform integrity verification on the security mode completion message; and send a setup completion message to the core network of the operator to which the user belongs in response to passing the integrity verification of the security mode completion message, wherein the setup completion message comprises the integrity protection algorithm and the encryption algorithm in the security mode command and is used for instructing the core network to start a security control process.

In some embodiments, the integrity protection key comprises an integrity protection key of control plane, and the encryption key comprises an encryption key of control plane and an encryption key of user plane.

In some embodiments, the operator identification is a PLMN identification, and determining a key generation algorithm preset by an operator to which the user to start the security mode belongs comprises: acquiring the PLMN identification corresponding to the user to start the security mode; and determine the key generation algorithm preset by the operator to which the user belongs according to a corresponding relation between the preset PLMN identification and the key generation algorithm.

In some embodiments, the original key is generated by the core network in response to initiating the security mode of an access stratum after a RRC connection setup is completed and authentication of Layer 3 is passed An embodiment of the configuration system of security mode of the present invention is described below with reference to FIGS. 6 and 7.

Figure 6:
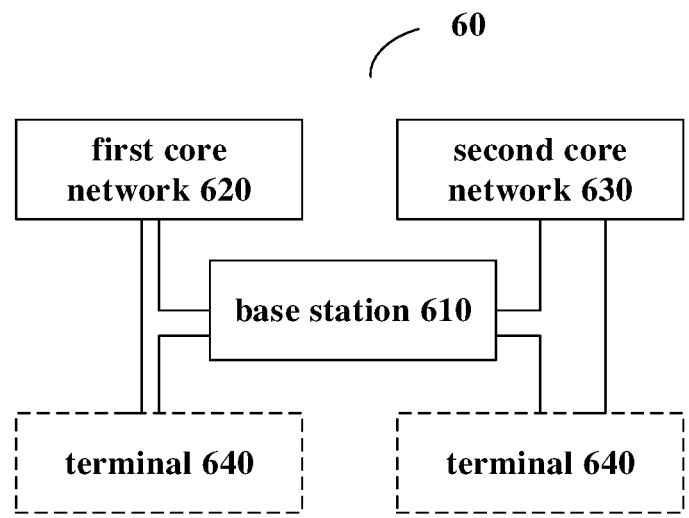
FIG. 6 illustrates a structural diagram of a configuration system of security mode according to some embodiments of the present invention.

FIG. 6 illustrates a structural diagram of a configuration system of security mode according to some embodiments of the invention. As shown in FIG. 6, the configuration system of security mode 60 of this embodiment comprises: a base station 610, comprising any one of the foregoing configuration device of security mode; a first core network 620 of the first operator, configured to send an integrity protection algorithm and an encryption algorithm of the first core network, an original key generated by the first core network, and an operator identification of the first core network to the base station, and send the original key generated by the first core network to a user of the first operator; a second core network 630 of the second operator configured to send an integrity protection algorithm and an encryption algorithm of the second core network, an original key generated by the second core network, and an operator identification of the second core network to the base station, and send the original key generated by the second core network to a user of the second operator, wherein the first operator and the second operator use a same shared carrier in the base station.

In some embodiments, configuration system of security mode 60 further comprises: a terminal 640 configured to generate an integrity protection key and an encryption key using the original key and the key generation algorithm sent from the core network of the operator of the terminal; generate verification information by using the integrity protection key generated by the terminal; and send the security mode completion message to the base station in a case where the verification information generated by the terminal is consistent with the verification information in the security mode command sent from the base station.

Figure 7:
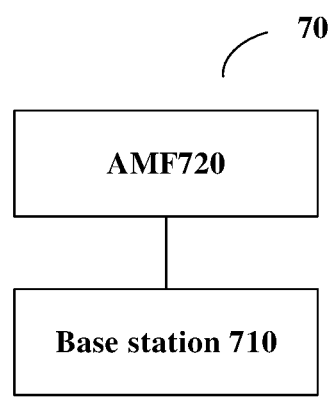
FIG. 7 illustrates a structural diagram of a configuration system of security mode according to further embodiments of the present invention.

FIG. 7 illustrates a structural diagram of a configuration system of security mode according to further embodiments of the invention. As shown in FIG. 7, the configuration system of security mode 70 of this embodiment comprises: a base station 710 comprising any one of the foregoing configuration devices of security mode; AMF 720 of the core network configured to determine an original key of Non-Access Stratum (NAS) signaling of the user according to an operator identification of the user, wherein the core network is shared by the first operator and the second operator; and generate an integrity protection key of NAS signaling and an encryption key of NAS signaling by adopting an integrity protection algorithm of NAS signaling and an encryption algorithm of NAS signaling corresponding to the operator identification.

In some embodiments, the AMF is further configured to generate an original key of the first operator and an original key of the second operator; and send the original key, the integrity protection algorithm and the encryption algorithm of the first operator, and the original key, the integrity protection algorithm and the encryption algorithm of the second operator to a base station.

In some embodiments, the operator identification is a PLMN identification.

Figure 8:
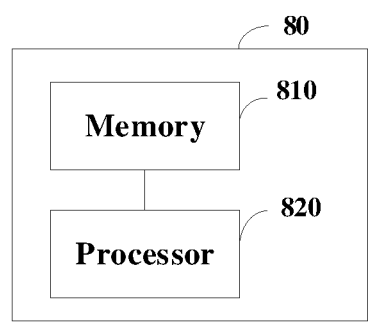
FIG. 8 shows a structural diagram of a configuration device of security mode according to further embodiments of the present invention.

FIG. 8 shows a schematic configuration of a configuration device of security mode according to further embodiments of the present invention. As shown in FIG. 8, the configuration device of security mode 80 of this embodiment comprises: a memory 810 and a processor 820 coupled to the memory 810, the processor 820 configured to perform the configuration method of security mode of any of the previous embodiments based on instructions stored in the memory 810.

Memory 810 may comprise, for example, system memory, fixed non-volatile storage media, and the like. The system memory stores, for example, an operating system, an application program, a boot loader, and other programs.

Figure 9:
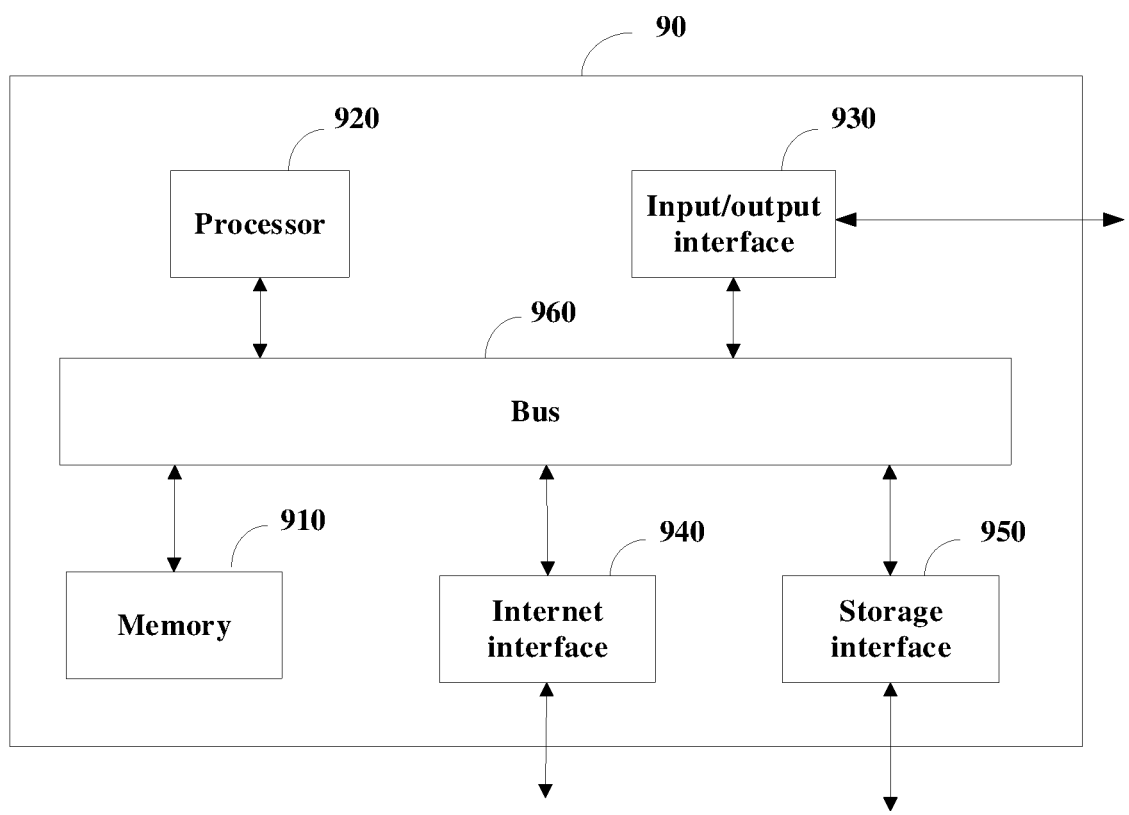
FIG. 9 shows a structural diagram of a configuration device of security mode according to further embodiments of the present invention.

FIG. 9 shows a structural diagram of a configuration device of security mode according to further embodiments of the present invention. As shown in FIG. 9, the configuration device of security mode 90 of this embodiment comprises: a memory 910 and a processor 920, and may also comprises an input/output interface 930, a network interface 940, a storage interface 950, and the like. These interfaces 930, 940, 950, the memory 910 and the processor 920 may be connected, for example, by a bus 960. The input/output interface 930 provides a connection interface for input/output devices such as a display, a mouse, a keyboard, and a touch screen, etc. The network interface 940 provides a connection interface for various networking devices. The storage interface 950 provides a connection interface for external storage devices such as an SD card and a USB disk.

An embodiment of the present invention further provides a computer-readable storage medium, on which a computer program is stored, where the computer program is configured to implement any one of the foregoing configuration method of security modes when executed by a processor.

As will be appreciated by one skilled in the art, embodiments of the present invention may be provided as a method, a system, or a computer program product. Accordingly, the present invention may take the form of an entirely hardware embodiment, an entirely software embodiment or an embodiment combining software and hardware aspects. Furthermore, the present invention may take the form of a computer program product embodied on one or more computer-usable non-transitory storage media (including, but not limited to, disk storage, CD-ROM, optical storage, and the like) having computer-usable program code embodied therein.

The present invention has been described with reference to flowchart illustrations and/or block diagrams of methods, devices (systems), and computer program products according to embodiments of the invention. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing device to produce a machine, such that the instructions, which execute via the processor of the computer or other programmable data processing device, create means for implementing the functions specified in the flowchart flow or flows and/or block diagram block or blocks.

These computer program instructions may also be stored in a computer-readable memory that can direct a computer or other programmable data processing device to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing device to cause a series of operational steps to be performed on the computer or other programmable device to produce a computer implemented process such that the instructions which execute on the computer or other programmable device provide steps for implementing the functions specified in the flowchart flow or flows and/or block diagram block or blocks.

The above description is only for the purpose of illustrating the preferred embodiments of the present invention and should not be taken as limiting the scope of the present invention, which is intended to cover any modifications, equivalents, improvements, etc. within the spirit and scope of the present invention.

What is claimed is:

1. A configuration method of security mode performed by a base station, comprising:
    acquiring, from a first core network, an integrity protection algorithm and an encryption algorithm of the first core network, an original key generated by the first core network, and an operator identification of the first core network, wherein the original key generated by the first core network is sent to a first user of the first operator to start a security mode;
    acquiring, from a second core network, an integrity protection algorithm and an encryption algorithm of the second core network, an original key generated by the second core network, and an operator identification of the second core network, wherein the original key generated by the second core network is sent to a second user of the second operator to start the security mode, and the first operator and the second operator use a same shared carrier in the base station which is a co-construction and sharing base station;
    for any user of the first user and the second user, determining a key generation algorithm preset by an operator to which the user belongs according to the operator identification of the first core network or the second core network;
    generating an integrity protection key and an encryption key of the user according to the key generation algorithm and the original key; and
    sending a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

2. The configuration method of security mode of claim 1, wherein the integrity protection key comprises an integrity protection key of control plane, and the encryption key comprises an encryption key of control plane and an encryption key of user plane.

3. The configuration method of security mode of claim 1, further comprising:
    acquiring a security mode completion message from the terminal of the user, wherein the security mode completion message is sent by the terminal after the verification of the security mode command is passed;
    performing integrity verification on the security mode completion message; and
    sending a setup completion message to the core network of the operator to which the user belongs in response to passing the integrity verification of the security mode completion message, wherein the setup completion message comprises the integrity protection algorithm and the encryption algorithm in the security mode command and is used for instructing the core network to start a security control process.

4. The configuration method of security mode of claim 1, wherein the operator identification is a Public Land Mobile Network (PLMN) identification, and the determining a key generation algorithm preset by the operator to which the user belongs according to the operator identification comprises:
    acquiring the PLMN identification corresponding to the user to start the security mode; and
    determining the key generation algorithm preset by the operator to which the user belongs according to a corresponding relation between the preset PLMN identification and the key generation algorithm.

5. The configuration method of security mode of claim 1, wherein the original key is generated by the core network in response to initiating the security mode of an access stratum after a radio resource control (RRC) connection setup is completed and authentication of Layer 3 (L3) is passed.

6. The secure mode configuration method of claim 1, further comprising:
    determining, by an Access and Mobility Management Function (AMF) in the core network, an original key of Non-Access Stratum (NAS) signaling of the user according to the operator identification of the user, wherein the core network is shared by the first operator and the second operator; and
    generating, by the AMF, an integrity protection key of NAS and an encryption key of NAS by adopting an integrity protection algorithm of NAS signaling and an encryption algorithm of NAS signaling corresponding to the operator identification.

7. The configuration method of security mode of claim 6, wherein the operator identification is a PLMN identification.

8. The configuration method of security mode of claim 1, further comprising:
    generating, by an AMF in the core network, an original key of the first operator and an original key of the second operator; and
    sending, by the AMF, the integrity protection algorithm, the encryption algorithm and the original key of the first operator, and the integrity protection algorithm, the encryption algorithm and the original key of the second operator to the base station.

9. A configuration device of security mode, comprising:
    a memory; and
    a processor coupled to the memory, the processor configured to, based on instructions stored in the memory, perform a configuration method of security mode comprising:
    acquiring, from a first core network, an integrity protection algorithm and an encryption algorithm of the first core network, an original key generated by the first core network, and an operator identification of the first core network, wherein the original key generated by the first core network is sent to a first user of the first operator to start a security mode;

acquiring, from a second core network, an integrity protection algorithm and an encryption algorithm of the second core network, an original key generated by the second core network, and an operator identification of the second core network, wherein the original key generated by the second core network is sent to a second user of the second operator to start the security mode, and the first operator and the second operator use a same shared carrier in a co-construction and sharing base station;

for any user of the first user and the second user, determining a key generation algorithm preset by an operator to which the user belongs according to the operator identification of the first core network or the second core network;

generating an integrity protection key and an encryption key of the user according to the key generation algorithm and the original key; and sending a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

10. A configuration system of security mode, comprising:
a base station comprising the configuration device of security mode of claim 9;
a first core network of a first operator, configured to send an integrity protection algorithm and an encryption algorithm of the first core network, an original key generated by the first core network, and an operator identification of the first core network to the base station, and send the original key generated by the first core network to a user of the first operator; and
a second core network of a second operator, configured to send an integrity protection algorithm and an encryption algorithm of the second core network, an original key generated by the second core network, and an operator identification of the second core network to the base station, and send the original key generated by the second core network to a user of the second operator, wherein the first operator and the second operator use a same shared carrier in the base station.

11. The configuration system of security mode of claim 10, further comprising:
a terminal configured to generate an integrity protection key and an encryption key using the original key and the key generation algorithm sent from the core network of the operator of the terminal; generate verification information by using the integrity protection key generated by the terminal; and send the security mode completion message to the base station in a case where the verification information generated by the terminal is consistent with the verification information in the security mode command sent from the base station.

12. A configuration system of security mode, comprising:
a base station comprising the configuration device of security mode of claim 9; and
an Access and Mobility Management Function (AMF) of a core network, configured to determine an original key of Non-Access Stratum (NAS) signaling of the user according to an operator identification of the user, wherein the core network is shared by the first operator and the second operator; and generate an integrity protection key of NAS signaling and an encryption key of NAS signaling by adopting an integrity protection algorithm of NAS signaling and an encryption algorithm of NAS signaling corresponding to the operator identification.

13. The configuration system of security mode of claim 12, wherein the AMF is further configured to generate an original key of the first operator and an original key of the second operator; and send the original key, the integrity protection algorithm and the encryption algorithm of the first operator, and the original key, the integrity protection algorithm and the encryption algorithm of the second operator to a base station.

14. A configuration system of security mode according to claim 12, wherein the operator identification is a PLMN identification.

15. The configuration device according to claim 9, wherein the integrity protection key comprises an integrity protection key of control plane, and the encryption key comprises an encryption key of control plane and an encryption key of user plane.

16. The configuration device according to claim 9, wherein the processor is further configured for:
acquiring a security mode completion message from the terminal of the user, wherein the security mode completion message is sent by the terminal after the verification of the security mode command is passed;
performing integrity verification on the security mode completion message; and
sending a setup completion message to the core network of the operator to which the user belongs in response to passing the integrity verification of the security mode completion message, wherein the setup completion message comprises the integrity protection algorithm and the encryption algorithm in the security mode command and is used for instructing the core network to start a security control process.

17. The configuration device according to claim 9, wherein the operator identification is a Public Land Mobile Network (PLMN) identification, and the determining a key generation algorithm preset by the operator to which the user belongs according to the operator identification comprises:
acquiring the PLMN identification corresponding to the user to start the security mode; and
determining the key generation algorithm preset by the operator to which the user belongs according to a corresponding relation between the preset PLMN identification and the key generation algorithm.

18. The configuration device according to claim 9, wherein the original key is generated by the core network in response to initiating the security mode of an access stratum after a radio resource control (RRC) connection setup is completed and authentication of Layer 3 (L3) is passed.

19. The configuration device according to claim 9, wherein the processor is further configured for:
determining, by an Access and Mobility Management Function (AMF) in the core network, an original key of Non-Access Stratum (NAS) signaling of the user according to the operator identification of the user, wherein the core network is shared by the first operator and the second operator; and
generating, by the AMF, an integrity protection key of NAS and an encryption key of NAS by adopting an integrity protection algorithm of NAS signaling and an encryption algorithm of NAS signaling corresponding to the operator identification.

20. A non-transitory computer readable storage medium having stored thereon a computer program which, when executed by a processor, cause the processor to:

acquiring, from a first core network, an integrity protection algorithm and an encryption algorithm of the first core network, an original key generated by the first core network, and an operator identification of the first core network, wherein the original key generated by the first core network is sent to a first user of the first operator to start a security mode;

acquiring, from a second core network, an integrity protection algorithm and an encryption algorithm of the second core network, an original key generated by the second core network, and an operator identification of the second core network, wherein the original key generated by the second core network is sent to a second user of the second operator to start the security mode, and the first operator and the second operator use a same shared carrier in a co-construction and sharing base station;

for any user of the first user and the second user, determining a key generation algorithm preset by an operator to which the user belongs according to the operator identification of the first core network or the second core network;

generating an integrity protection key and an encryption key of the user according to the key generation algorithm and the original key; and sending a security mode command to a terminal of the user, wherein the security mode command comprises verification information encrypted by the integrity protection key of the user, the integrity protection algorithm and the encryption algorithm, and the terminal has the key generation algorithm preset by the operator to which the user belongs.

* * * * *